United States Patent
Kano

[11] 3,860,327
[45] Jan. 14, 1975

[54] HIGH RESOLVING POWER COPYING LENS OF UNITY MAGNIFICATION

[75] Inventor: Ichiro Kano, Yokohama, Japan

[73] Assignee: Canon Kabushiki Kaisha, Tokyo, Japan

[22] Filed: Jan. 12, 1973

[21] Appl. No.: 323,226

[30] Foreign Application Priority Data
Jan. 31, 1972  Japan.............................. 47-10564

[52] U.S. Cl. .................................................. 350/214
[51] Int. Cl. ............................................... G02b 9/64
[58] Field of Search .................................... 350/214

[56] References Cited
UNITED STATES PATENTS
3,524,699  8/1970  Mori ............................. 350/214 X
3,733,115  5/1973  Cox................................. 350/214

*Primary Examiner*—John K. Corbin
*Attorney, Agent, or Firm*—McGlew and Tuttle

[57] ABSTRACT

A symmetrical copying lens, which is corrected for spherical aberration, astigmatism, field curvature and off-axis halo to high degree, is divided into two identical halves extending from respective opposite sides of an equiconcave lens member formed by cementing two double concave lenses to the respective opposite surfaces of a double convex lens. Each lens half comprises, starting from the outer end thereof and continuing toward a common equiconcave lens member, a first double concave lens member, a second double convex lens member, a third double convex lens member, a positive meniscus lens member concave toward the common central lens member and a negative meniscus lens member composed of two cemented lens elements and of which the surface nearest the center of the lens assembly is concave toward the center. The parameters of the several lens members are such as to provide a high degree of correction of spherical aberration, proper correction of field curvature and off-axis halo, and proper balancing of spherical aberration, field curvature and off-axis halo.

5 Claims, 3 Drawing Figures

PATENTED JAN 14 1975    3,860,327

HIGH RESOLVING POWER COPYING LENS OF UNITY MAGNIFICATION

FIELD AND BACKGROUND OF THE INVENTION

This invention relates to a lens system which is suited for projection purpose in copy work and the like at unity magnification with superhigh resolving power as required in printing the images of photomasks on wafers to produce integrated circuits. Lenses of this type require high resolving power over the entire field so that they should be corrected for spherical aberration, coma, astigmatism, field curvature, off-axis halo and distortion to high degree. Hitherto the lens members of lens system of unity magnification have been so arranged as to effect automatic correction of coma and distortion, and this invention also takes advantage of this arrangement. Therefore, the aberrations which present problems are spherical aberration, astigmatism, field curvature and off-axis halo. In general, simultaneous high degree correction of thse aberrations particularly, off-axis halo and field curvature, in lens of symmetrical form are difficult to accomplish.

SUMMARY OF THE INVENTION

The present invention is directed to obviating the difficulties involved, by the use of certain lens constructions as set forth hereinafter, and makes possible a high degree correction of all aberrations. In particular, the present invention is directed to correcting simultaneously off-axis and field curvature in a lens of symmetrical structure.

For an understanding of the principles of the invention, reference is made to the following description of a typical embodiment thereof as illustrated in the accompanying drawing.

BRIEF DESCRIPTION OF THE DRAWING

In the Drawing:

FIG. 1 is a lens block diagram of one embodiment of a symmetrical copying lens in accordance with the present invention; and FIGS. 2A and 2B are graphs illustrating, respectively, the spherical aberration and the astigmatism corrections of the embodiment of the invention shown in FIG. 1.

DESCRIPTION OF THE PREFERRED EMBODIMENT

The lens members of the lens of this invention are arranged in a longitudinally symmetrical form, in which, disposed at the opposite ends, are negative meniscus or double concave lens members (I) (I) which are concave toward the center of the lens assembly, followed inwardly by two double convex lens members (II)(II), (III)(III) on each side, followed by positive meniscus lens members (IV)(IV) which are concave toward the center, followed by negative meniscus lens members (V)(V), each made up of two cemented lens elements of which the surfaces nearest the center are concave toward the center, and a singlet or multiplet double convex lens (VI), symmetrical as a whole, in the center of the lens assembly, the lens system satisfying the following conditions:

| (1) | $0.5f$ | $<$ | $f_A$ | $<$ | $0.9f$ |
|---|---|---|---|---|---|
| (2) | $0.1f$ | $<$ | $d_V$ | $<$ | $0.3f$ |
| (3) | $0$ | $<$ | $\lvert r_{11}\rvert / \lvert r_{12}\rvert$ | $<$ | $0.2$ |
| (4) | $0.3$ | $<$ | $f(1/e\, f_I + 1/f_{II})$ | $<$ | $0.6$ |
| (5) | $0.4$ | $<$ | $f/f_{III}$ | $<$ | $0.7$ |
| (6) | $0.7$ | $<$ | $f/f_{IV}$ | $<$ | $0.9$ |
| (7) | $0.03$ | $<$ | $n_{V_2} - N_{V_1}$ | $<$ | $0.2$ | wherein $f$: focal length of the entire lens sytem $f_A$: focal length in air of each half of the entire lens system when divided at the center into two blocks (A)(A)

$f_I$, $f_{II}$, $f_{III}$, $f_{IV}$: focal lengths of lens members (I)(II)(III)(IV) respectively $d_V$: axial thickness of lens member (V)

$r_{11}$: radius of curvature of the 11th surface counting inwardly from the outermost one $r_{12}$: radius of curvature of the 12th surface counting inwardly from the outermost one $n_{V_1}$: refractive index of the outer lens element of lens member (V)

$n_{V_2}$: refractive index of the inner lens element of lens member (V)

These conditions will be explained herebelow.

Condition (1) is a fundamental condition which controls the total length of the lens along the optical axis, the distance between the lens and the image plane, or operation distance, and the state of correction of the aberrations in proper relationship therebetween. As $f_A$ is decreased from the lower limit, the total length of the lens along the optical axis becomes too long, and the operation distance becomes too short, so that conditions below the lower limit will be undesirable from the point that the lens system should be made in length and a sufficient operation distance should be assured. As $f_A$ exceeds the upper limit, high degree correction of field curvature and off-axis halo is impossible.

Condition (2) must be satisfied for proper correction of field curvature and off-axis halo. A condition below the lower limit results in an under-correction of field curvature, while a condition above the upper limit strengthens the tendency to over-correction of off-axis halo.

Condition (3) also must be satisfied for proper correction of field curvature and off-axis halo. A condition below the lower limit strengthens the tendence to over-correction of off-axis halo, while a condition above the upper limit results in an undercorrection of field curvature.

Conditions (4), (5) and (6) must be satisfied for high degree correction of spherical aberration. If any one of the three conditions is not satisfied, the positive refraction power configuration of the lens system will lack balance so that the spherical aberration, occurring in a lens member having an especially strong refractive power, cannot be compensated in other parts. Condition (7) must be satisfied for balancing properly spherical aberration, field curvature and off-axis halo. A condition below the lower limit makes impossible high degree correction spherical aberration, and strengthens the tendency to over-correction of off-axis halo, while a condition above the upper limit results in an undercorrection of field curvature.

The constructional data relating to the lens embodying this invention are given herebelow, wherein $r$: radius of curvature of the successive lens refracting surfaces, $d$: axial thickness of air spacing of the successive lens members, $n$: refractive index for g line of the successive lens members, $v$: Abbe's number of the successive lens member glasses, and in the entire system and the $f = 1.0000$ F number is 3.6:

| | | | | | |
|---|---|---|---|---|---|
| I | $r_1 = -4.6290$ | | | | |
| | $r_2 = 0.8524$ | $d_1 = 0.0290$ | $n_1 = 1.62382$ | $v_1 = 38.0$ | |
| | | $d_2 = 0.0344$ | | | |
| II | $r_3 = 0.8053$ | $d_3 = 0.0755$ | $n_2 = 1.69312$ | $v_2 = 55.3$ | |
| | $r_4 = -1.4731$ | | | | |
| | | $d_4 = 0.0007$ | | | |
| III | $r_5 = 1.7173$ | $d_5 = 0.0523$ | $n_3 = 1.69312$ | $v_3 = 55.3$ | |
| | $r_6 = -6.0868$ | | | | |
| | | $d_6 = 0.0007$ | | | |
| IV | $r_7 = 0.6165$ | $d_7 = 0.1045$ | $n_4 = 1.69312$ | $v_4 = 55.3$ | |
| | $r_8 = 2.2343$ | | | | |
| | | $d_8 = 0.0007$ | | | |
| V | $r_9 = 0.4669$ | $d_9 = 0.1181$ | $n_5 = 1.52621$ | $v_5 = 64.1$ | |
| | $r_{10} = -0.8437$ | $d_{10} = 0.0683$ | $n_6 = 1.65742$ | $v_6 = 44.9$ | |
| | $r_{11} = 0.2664$ | | | | |
| | | $d_{11} = 0.0862$ | | | |
| VI | $r_{12} = -2.0029$ | $d_{12} = 0.0116$ | $n_7 = 1.66373$ | $v_7 = 34.6$ | |
| | $r_{13} = 4.7976$ | $d_{13} = 0.0464$ | $n_8 = 1.66381$ | $v_8 = 53.0$ | |
| | $r_{13} = -4.7976$ | $d_{12} = 0.0116$ | $n_7 = 1.66373$ | $v_7 = 34.6$ | |
| | $r_{12} = 2.0029$ | | | | |
| | | $d_{11} = 0.0862$ | | | |
| V | $r_{11} = -0.2664$ | $d_{10} = 0.0683$ | $n_6 = 1.65742$ | $v_6 = 44.9$ | |
| | $r_{10} = 0.8437$ | $d_9 = 0.1181$ | $n_5 = 1.52621$ | $v_5 = 64.1$ | |
| | $r_9 = -0.4669$ | | | | |
| | | $d_8 = 0.0007$ | | | |
| IV | $r_8 = -2.2343$ | $d_7 = 0.1045$ | $n_4 = 1.69312$ | $v_4 = 55.3$ | |
| | $r_7 = -0.6165$ | | | | |
| | | $d_6 = 0.0007$ | | | |
| III | $r_6 = 6.0868$ | $d_5 = 0.0523$ | $n_3 = 1.69312$ | $v_3 = 55.3$ | |
| | $r_5 = -1.7173$ | | | | |
| | | $d_4 = 0.0007$ | | | |
| II | $r_4 = 1.4731$ | $d_3 = 0.0755$ | $n_2 = 1.69312$ | $v_2 = 55.3$ | |
| | $r_3 = -0.8053$ | | | | |
| | | $d_2 = 0.0344$ | | | |
| I | $r_2 = -0.8524$ | $d_1 = 0.0290$ | $n_1 = 1.62382$ | $v_1 = 38.0$ | |
| | $r_1 = 4.6290$ | | | | |

Figures 1, 2A, 2B:
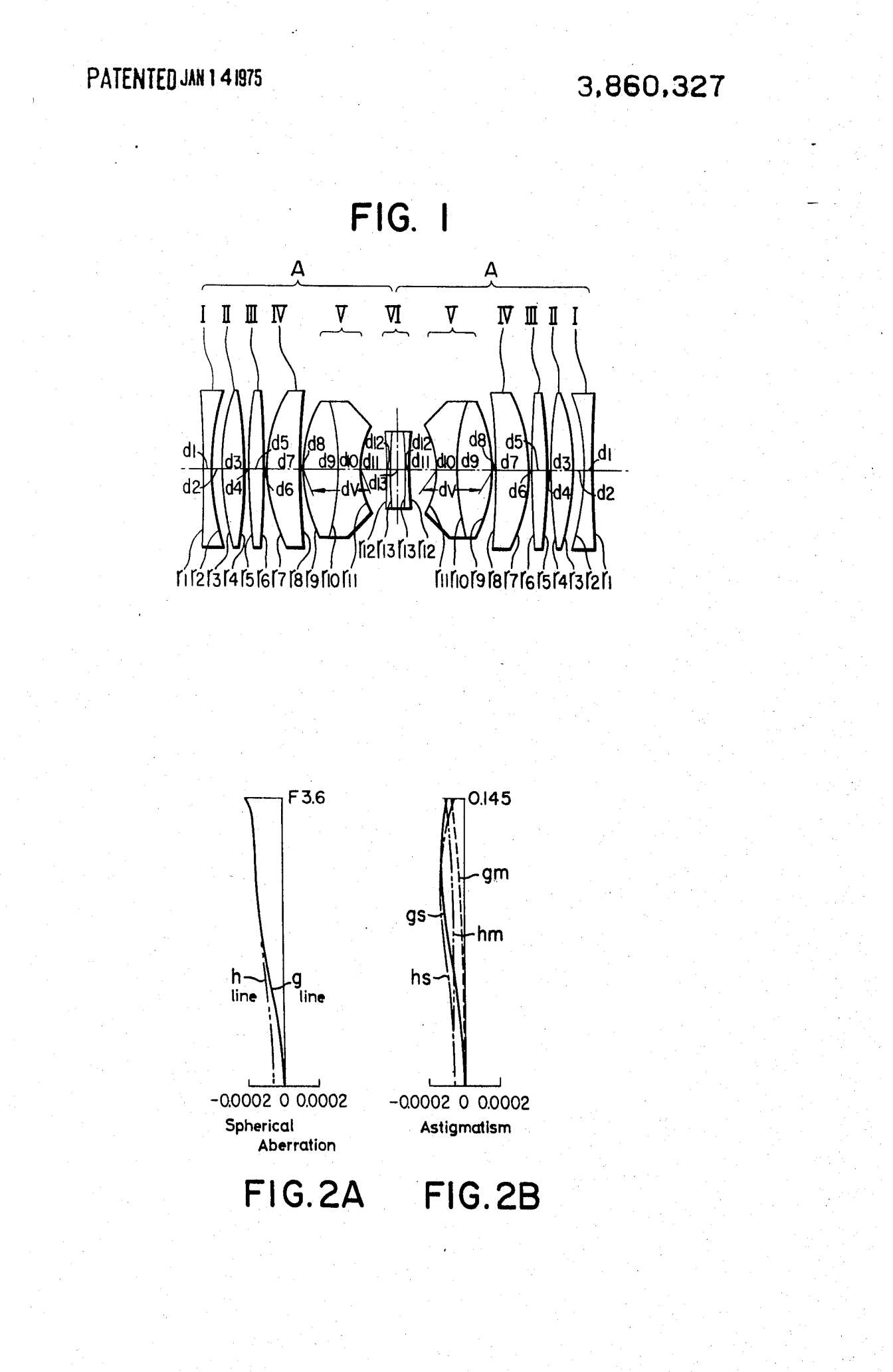

FIGS. 2A and 2B are graphs of aberrations in the above-mentioned embodiment showing very excellent correction for each of the spherical and astigmatism aberrations. There is no distortion because the lens arrangement is of the perfect symmetry type.

While a specific embodiment of the invention has been shown and described in detail to illustrate the application of the principles of the invention, it will be understood that the invention may be embodied otherwise without departing from such principles.

What is claimed is:

1. A high resolving power copying lens, of unity magnification, comprising a longitudinally symmetrical lens assembly including, in succession and starting from the opposite outer ends of the assembly and proceeding toward the center of the assembly, two lens members (I) (I) having their surfaces with the smaller absolute value of radius of curvature facing toward the center of said lens assembly, at least four double convex lens members (II) (II), (III) (III), two positive meniscus lens members (IV) (IV) having concave surfaces facing toward the center of said lens assembly, two negative meniscus lens members (V) (V) each comprising two lens elements cemented together and having their surfaces nearest the center of said lens assembly concave toward said center, and an equiconcave lens member (VI) at the center of said lens assembly and common to both symmetrical halves of said lens assembly.

2. A high resolving power copying lens, as claimed in claim 1, in which said equiconcave lens member (VI) is a cemented lens.

3. A high resolving power copying lens, as claimed in claim 2, in which said cemented equiconcave lens member (VI) consists of a double convex lens and two double concave lenses, each double concave lens being cemented to a respective opposite surface of said double convex lens.

4. A high resolving power copying lens, as claimed in claim 1, in which each negative lens member (I) at the outermost position is a double concave lens.

5. A high resolving power copying lens, of unity magnification, comprising a longitudinally symmetrical lens assembly including, in succession and starting from the opposite outer ends of the assembly and proceeding toward the center of the assembly, lens members (I) (I)

having their surfaces with the smaller absolute value of radius of curvature facing toward the center of said lens assembly, pairs of double convex lens members (II) (II), (III) (III), positive meniscus lens members (IV) (IV) having concave surfaces facing toward the center of said lens assembly, negative meniscus lens members (V) (V) each comprising two lens elements cemented together and having their surfaces nearest the center of said lens assembly concave toward said center, and an equiconcave lens member (VI) at the center of said lens assembly and common to both symmetrical halves of said lens assembly; said copying lens having the following constructional data:

$r$: radius of curvature of the successive lens refracting surfaces $d$: axial thickness and air spacing of the successive lens members $n$: refractive index for $g$ line of the successive lens members $v$: Abbe's number of the successive lens member glasses in the entire assembly $f = 1.0000$ and the F number is 3.6

|      | $r$         | $d$          | $n$         | $v$        |
|------|-------------|--------------|-------------|------------|
|      | $r_1 = -4.6290$ | $d_1 = 0.0290$ | $n_1 = 1.62382$ | $v_1 = 38.0$ |
|      | $r_2 = 0.8524$  | $d_2 = 0.0344$ |             |            |
|      | $r_3 = 0.8053$  | $d_3 = 0.0755$ | $n_2 = 1.69312$ | $v_2 = 55.3$ |
|      | $r_4 = -1.4731$ | $d_4 = 0.0007$ |             |            |
|      | $r_5 = 1.7173$  | $d_5 = 0.0523$ | $n_3 = 1.69312$ | $v_3 = 55.3$ |
|      | $r_6 = -6.0868$ | $d_6 = 0.0007$ |             |            |
|      | $r_7 = 0.6165$  | $d_7 = 0.1045$ | $n_4 = 1.69312$ | $v_4 = 55.3$ |
|      | $r_8 = 2.2343$  | $d_8 = 0.0007$ |             |            |
|      | $r_9 = 0.4669$  | $d_9 = 0.1181$ | $n_5 = 1.52621$ | $v_5 = 64.1$ |
|      | $r_{10} = -0.8437$ | $d_{10} = 0.0683$ | $n_6 = 1.65742$ | $v_6 = 44.9$ |
|      | $r_{11} = 0.2664$ | $d_{11} = 0.0862$ |             |            |
|      | $r_{12} = -2.0029$ | $d_{12} = 0.0116$ | $n_7 = 1.66373$ | $v_7 = 34.6$ |
| VI   | $r_{13} = 4.7976$  | $d_{13} = 0.0464$ | $n_8 = 1.66381$ | $v_8 = 53.0$ |
|      | $r_{13} = -4.7976$ | $d_{12} = 0.0116$ | $n_7 = 1.66373$ | $v_7 = 34.6$ |
|      | $r_{12} = 2.0029$  | $d_{11} = 0.0862$ |             |            |
|      | $r_{11} = -0.2664$ | $d_{10} = 0.0683$ | $n_6 = 1.65742$ | $v_6 = 44.9$ |
| V    | $r_{10} = 0.8437$  | $d_9 = 0.1181$ | $n_5 = 1.52621$ | $v_5 = 64.1$ |
|      | $r_9 = -0.4669$    | $d_8 = .0007$  |             |            |

* * * * *